United States Patent [19]
Narron

[11] Patent Number: 6,032,684
[45] Date of Patent: Mar. 7, 2000

[54] PORTABLE PRIVACY SCREEN FOR A RESIDENTIAL DECK

[76] Inventor: R. Clayton Narron, 415 S. 4th St., Smithfield, N.C. 27577

[21] Appl. No.: 08/982,296

[22] Filed: Dec. 2, 1997

[51] Int. Cl.[7] ................................................. A01M 31/00
[52] U.S. Cl. ........................ 135/90; 160/378; 135/120.1
[58] Field of Search ................................. 52/64–65, 71; 135/90, 97, 120.1, 143, 119; 160/369, 371, 372, 378, 379, 403, 404

[56] References Cited

U.S. PATENT DOCUMENTS

| | | | |
|---|---|---|---|
| 5,379,786 | 1/1995 | Lyman | 135/87 |
| 5,613,512 | 3/1997 | Bean | 135/90 |
| 5,664,556 | 9/1997 | Byers | 160/135 X |
| 5,669,403 | 9/1997 | Belcher et al. | 135/90 |
| 5,730,666 | 3/1998 | Hudson | 473/421 |

*Primary Examiner*—Beth Aubrey
*Attorney, Agent, or Firm*—Coats & Bennett, P.L.L.C.

[57] ABSTRACT

The present invention relates to a portable privacy screen that utilizes one or more decorative or plain panels which may be quickly and easily clamped or otherwise installed on a typical residential deck structure so as to provide the homeowner with the added element of privacy from neighboring dwellings. The case of the embodiment illustrated herein, the privacy screen includes a pair of panels that are hinged together such that they may be easily secured to the corner area of a deck structure. Also, in the embodiment illustrated herein, the privacy screen is provided with a deck mounting structure that enables the entire privacy screen to be detachably mounted to the railing structure of a conventional residential deck.

20 Claims, 2 Drawing Sheets

PORTABLE PRIVACY SCREEN FOR A RESIDENTIAL DECK

FIELD OF THE INVENTION

The present invention relates to portable privacy screens, and more particularly to a portable privacy screen which is adapted to be quickly and easily mounted to and removed from a conventional residential deck structure.

BACKGROUND OF THE INVENTION

In recent years, the trend in residential development has been towards smaller building lot sizes, which has consequently resulted in the construction of homes that are very closely spaced with respect to one another. Among the many problems that result from development of such densely packed residential neighborhoods, loss of personal privacy tends to be one of the most common complaints of homeowners. In particular, residents of these high-density developments often report experiencing a marked loss of privacy in the outdoor areas, immediately adjacent their home.

While architects may attempt to provide some degree of privacy to homeowners through careful design and layout of the interior structures of a dwelling and additionally through landscaping and carefully considered orientation of the overall dwelling structure within confines of the allotted building space, such attempts often fail to provide privacy to the homeowners once they step outside of their home. For instance, it is currently quite popular in most parts of the country to include a wooden deck structure on the rear of new homes. However, it is often the case that adjacent or neighboring deck structures are separated by only a few feet or yards due to the proximity of the neighboring dwellings. In such cases, the usefulness and overall appeal of the deck tends to be diminished in the eyes of the homeowners, as the elements of visual and acoustic privacy have been effectively eliminated.

Therefore, there is and continues to be a need for a lightweight and portable privacy screen that is of a simple design and consequently easily manufactured, which can be utilized on a typical residential deck structure.

SUMMARY OF THE INVENTION

The present invention entails a portable privacy screen that is designed such that it can be easily detachably mounted to a deck structure of the type typically associated with a residential dwelling. The privacy screen of the present invention includes an open type frame structure and a pliable privacy cover that is adapted to be detachably mounted to the open frame structure. In one embodiment of the present invention, a series of fasteners are provided for detachably securing the pliable privacy cover to the open frame structure. In addition, the privacy screen is provided with a deck mounting structure that permits the privacy screen to be directly attached to a portion of the deck structure such as the deck railing. In the embodiment disclosed herein, the deck mounting structure includes a clamping bar that is designed to be secured to a portion of the frame structure in such a manner that the railing structure extends between the frame structure and a clamping bar. The clamping bar in conjunction with a portion of the frame structure cooperate to sandwich a run of the deck railing structure therebetween. Consequently, in such an embodiment, the entire privacy screen is suspended or supported above the floor of the deck structure.

In a certain embodiment of the present invention, the frame structure comprises two like open frame panels that are hinged together. A pliable privacy cover is detachably secured to each frame panel by cooperating fasteners such as snaps or other similar fasteners. This embodiment of the portable privacy screen can, for example, be secured and supported within a corner area of a deck structure. Since the panels are connected by a hinge, it is appreciated that they can be disposed at various angles with respect to each other. To support this particular embodiment of the privacy screen, there is provided one or more clamping bars that are secured to the frame structure of the privacy screen such that a portion of the railing structure of the deck can be inserted between the clamping bar and the frame structure as discussed above. The result of this securing arrangement means that the entire privacy screen is supported independently of the floor of the deck structure and is particularly suspended or supported about the deck railing structure.

It is therefore an object of the present invention to provide a portable privacy screen that is particularly adapted to be mounted to the deck structure of a residential building.

Another object of the present invention is to provide a portable privacy screen that is simple in construction, relatively inexpensive to manufacture, and which can be easily erected.

A more specific object of the present invention is to provide a privacy screen having an associated mounting structure for suspending the privacy screen to a railing structure of a deck.

Another object of the present invention resides in the provision of a privacy screen that includes a detachable pliable privacy cover that can be replaced by a series of additional pliable privacy covers having different designs or ornamentations incorporated thereon.

A further object of the present invention resides in the provision of a portable privacy screen that is of a basic construction that enables the privacy screen to be easily attached and detached to a variety of structures.

Other objects and advantages of the present invention will become apparent and obvious from a study of the following description and the accompanying drawings, which are merely illustrative of such invention.

DETAILED DESCRIPTION OF THE INVENTION

Figure 1:
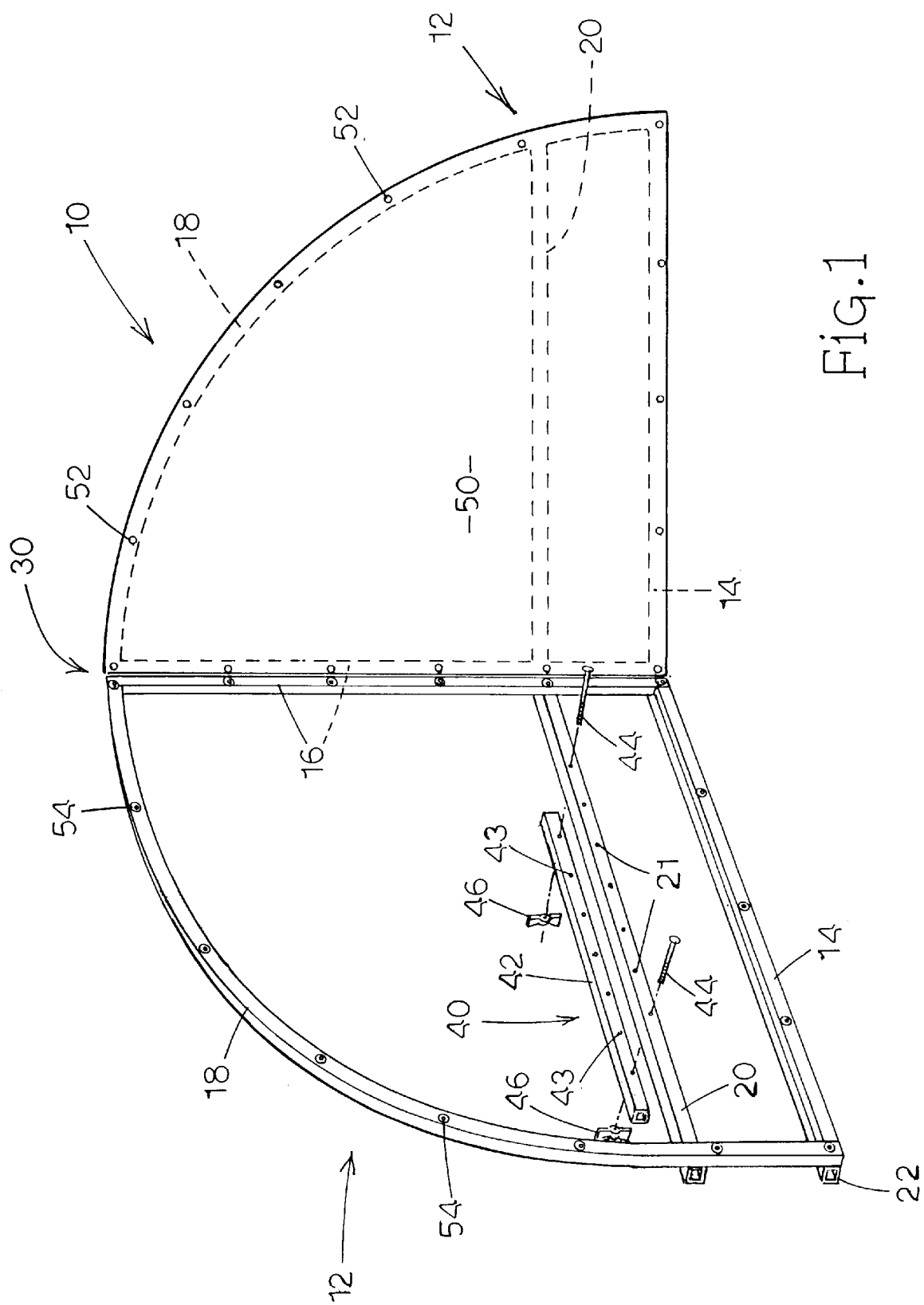
FIG. 1 is an exploded perspective view of the portable privacy screen of the present invention.

With further reference to the drawings, the portable privacy screen of the present invention is shown therein and indicated generally by the numeral 10. In the embodiment illustrated, privacy screen 10 comprises a pair of generally symmetric mainframes indicated generally by the numeral 12. Each mainframe includes a base or lower member 14, a vertical member 16, and a curved or arched interconnecting member 18. Various types of material, such as metal, plastic or the like, could be used to form the mainframe structure. Connections between the base member 14, vertical member 16 and the curved interconnecting member 18 can be provided through weldment or other suitable securing means. In the end, as viewed in FIG. 1, it is seen that each mainframe 12 is of an open construction and is basically comprised of a surrounding perimeter frame that is made up of the base or lower member 14, vertical member 16 and the arched or curved interconnecting member 18.

Each mainframe 12 includes a front and back side. Extending intermediately across the back side of each mainframe is a transverse bar or reinforcing member 20. The transverse bar or reinforcing member 20 is secured about one end to the vertical member 16 and secured about the other end to the interconnecting curved member 18. As illustrated in FIG. 1, the transverse or reinforcing member 20 extends generally parallel to the base or lower member 14.

Reinforcing member 20 in addition to reinforcing each mainframe 12, cooperates with other structure to be hereinafter described to secure the entire privacy screen 10 to a conventional deck structure that in conventional fashion is typically found extending from a residential building. Accordingly, the reinforcing member 20 includes a series of spaced apart bolt openings 21 formed therein. Subsequently herein, the significance of the bolt openings 21 will be discussed.

Aligned with and generally disposed below the reinforcing member 20 is a spacer 22. Spacer 22 like reinforcing member 20 is secured to the back side of each respective mainframe 12. More particularly, spacer 22 is secured adjacent the base or lower member 14.

Figure 2:
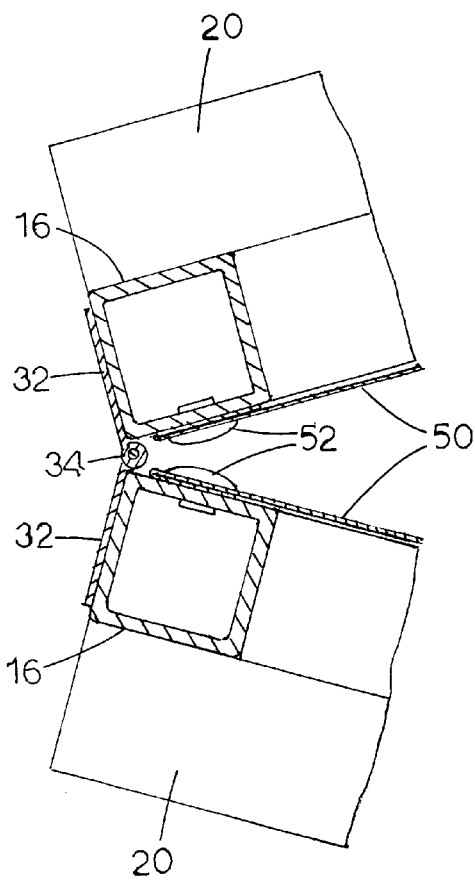
FIG. 2 is a fragmentary cross-sectional view illustrating the hinged construction of the privacy screen shown in FIG. 1.

In the case of the embodiment shown in FIG. 1, the mainframes 12 are interconnected together by a hinge structure. More particularly, the hinge structure is of a piano-type hinge and is indicated generally by the numeral 30. Piano hinge 30 is formed by a series of spaced apart tabs 32 that project from the vertical frame members 12, as best seen in FIG. 2. Each of the respective tabs 32 includes a terminal end that is curled and the respective curled terminal ends of the tabs 30 form an elongated pin aperture. Secured within the formed pin aperture is an elongated hinge pin 34. The elongated hinge pin 34 and the tabs 32 form the piano hinge structure 30 that enables the mainframes 12 to be pivoted with respect to each other.

The privacy screen 10 is provided with a deck mounting structure indicated generally by the numeral 40 that enables the privacy screen 10 to be secured to a portion of a deck structure. Deck mounting structure 40 includes, in the case of the embodiment shown in FIG. 1, a pair of clamping bars 42. Each clamping bar 42 includes a series of spaced apart bolt openings 43. In addition, there is provided a series of bolts 44 and nuts 46 that permit each clamping bar 42 to be effectively secured to a respective reinforcing member 20. Note that each clamping bar 42 is adapted to be connected to a respective reinforcing member 20 via the bolts 44 and nuts 46. As will be discussed in more detail subsequently herein, the deck mounting structure is designed such that the clamping bars 42 and the reinforcing members 20, in the design of FIG. 1, are adapted to sandwich a portion of the deck, particularly a segment of a railing structure such that the entire privacy screen 10 is suspended above the floor of the deck. This is particularly illustrated in FIG. 3.

Secured to each of the mainframes 12 is a pliable privacy cover 50. Each pliable privacy cover 50 is designed such that it can be detachably secured to a respective mainframe 12. Various types of material may be utilized for the privacy cover. For example, a canvas-type material such as typically used for awning or as a cover for boats and the like could be used. In addition, the privacy cover 50 may be painted a variety of colors or could include any one of a number of designs such as a college logo, for example.

In order that the pliable privacy cover 50 may be detachably secured to the mainframes 12, the privacy cover 50 is provided with a series of snap heads 52 that are incorporated about the perimeter of the privacy cover. The snap heads 52 are designed to mate with and snap onto a series of spaced apart snap receivers 54 that are secured about the front face of the mainframes 12. It is noted that the snap receivers 54 and the snap heads 52 would be spaced apart equal distances such that when the privacy cover 50 is secured to the mainframes 12, the privacy cover is held and supported in a generally taut fashion.

In the embodiment illustrated in FIG. 1, it is appreciated that the privacy screen 10 is shown in the form of two mainframes or basic frame structures. It should be understood that the privacy screen 10 of the present invention can be embodied within a simple single frame structure.

Figure 3:
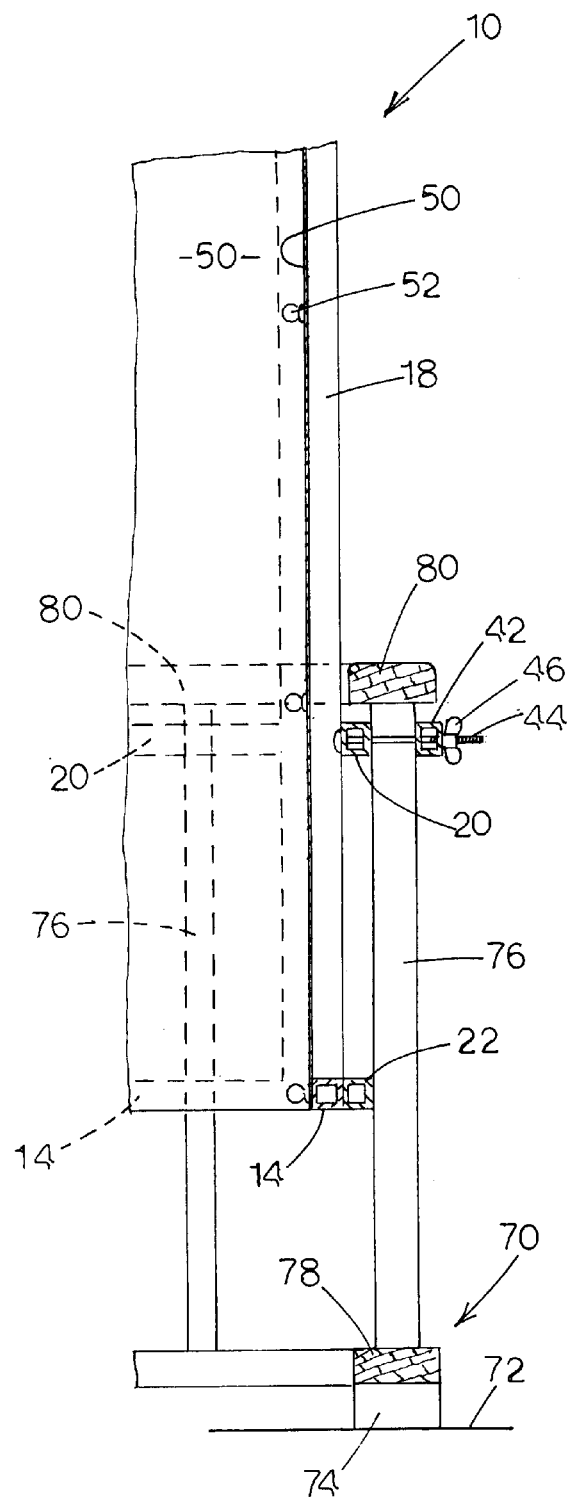
FIG. 3 is an elevational view showing a portion of the privacy screen secured about the railing structure of a deck.

To illustrate how the privacy screen 10 of the present invention is capable of being detachably mounted to a deck structure, reference is made to FIG. 3 and the deck structure shown therein which is indicated generally by the numeral 70. Before discussing how the privacy screen is attached to the deck structure 70, it will be beneficial to briefly review the basic structure of such a deck. In that regard, note that deck structure 70 includes a floor 72. Supported about the floor is a continuous railing structure that would include one or more end or corner members 74. A series of pickets or vertical members 76 extend between an elongated bottom plate 78 and an elongated top plate 80. This is simply an example of a deck structure and its associated railings. It will be understood by those skilled in the art that the structure of the deck can vary.

As illustrated in FIG. 3, the privacy screen 10 is secured about one corner of the deck structure 70. Note in this regard, where the reinforcing members 20 and the lower spacers 22 assume a position directly adjacent or abutting the inside of the railing structure 70. To suspend the privacy screen 10 above the floor 72, the clamping bars 42 are secured to the reinforcing members 20 via the series of bolts 44 and nuts 46. Effectively, the railing structure and particularly the vertical pickets 76 are compressed or sandwiched between the elongated reinforcing members 20 and the clamping bars 42. By such an arrangement, the entire privacy screen 10 can be suspended above the floor 72 of the deck and indeed suspended in such a fashion that there is no support structure extending downwardly from the privacy screen 10 to the floor of the deck. In addition, it is appreciated that the height of the privacy screen can be adjusted simply by loosening the nuts 46 on the bolts 44 and sliding the entire privacy screen up and down on the railing structure until a selected height is reached. Thereafter, the nuts 46 can be screwed tightly on the bolts 44 again resulting in the clamping bars 42 and the reinforcing members 20 compressing the railing structure in such a fashion that the deck mounting structure is frictionally held on the railing structure.

It is appreciated that the deck mounting structure may incorporate other mounting devices, such as brackets, etc., for permanently or semi-permanently securing the privacy screen to the deck structure. In addition, as eluded to beforehand, the privacy screen 10 may be presented in the form of a single panel and that single panel can be secured to a deck structure in a manner like that just described.

From the foregoing specification and discussion, it is appreciated that the present invention entails a new and unique privacy screen that can be easily secured in a number of ways to a deck structure extending from a residential building in order to create and yield a sense of privacy about the deck structure. Further, the structure of the privacy screen 10 of the present invention is relatively simple in design, can be manufactured easily, and can be detachably mounted to a deck structure in a host of convenient ways.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A portable privacy screen adapted to be connected to a railing structure of a deck comprising: an open frame structure including a surrounding outer frame; a pliable cover adapted to be secured to the surrounding outer frame; fasteners for detachably securing the pliable cover to the frame structure; and a deck railing mounting structure associated with the frame structure for securing the frame structure to the railing structure of the deck and formed by two members that sandwich a portion of the deck railing structure.

2. The privacy screen of claim 1 wherein the two members that form the deck mounting structure include a stationary cross member that forms a part of the frame structure and an attachable bar adapted to be attached to the cross-member such that the privacy screen can be attached to the deck structure by sandwiching a portion of the deck structure between the cross-member and the attachable bar and effectively clamping the privacy screen to the deck structure sandwiched between the cross-member and the attachable bar.

3. The privacy screen of claim 2 wherein the deck railing mounting structure includes a series of spaced apart bolts that secure the attachable bar to the cross-member such that in an attached mode the attachable bar and cross-member extend in general parallel relationship and sandwich a portion of the deck structure there between.

4. A portable privacy screen for attachment to a deck structure comprising:
    a) a plurality of frame assemblies with each frame assembly including a surrounding perimeter frame that defines an open area within the perimeter frame;
    b) a hinge structure pivotally interconnecting the frame assemblies of the privacy screen;
    c) a pliable privacy cover adapted to be secured to each frame assembly so as to span the open area defined within the perimeter frames;
    d) cooperating fasteners associated with the frame assemblies and the pliable privacy covers detachably securing the privacy covers to the frame assemblies, the cooperating fasteners including a first set of fasteners secured to the perimeter frame of each frame assembly and a second set of mating fasteners secured to the pliable privacy covers and wherein by fastening the first set of mating fasteners to the second set of mating fasteners the privacy covers are secured to the frame assemblies; and
    e) a deck railing mounting structure associated with the portable privacy screen for mounting and suspending the frame assemblies to a railing of the deck structure.

5. The portable privacy screen of claim 4 wherein the deck railing mounting structure includes a transverse bar extending across the perimeter frame of each frame assembly; a series of spaced apart bolt openings formed in the transverse bar, a clamping bar having a series of spaced apart bolt openings formed therein; and a series of bolt and nuts interconnecting the transverse bar with the clamping bar in such a fashion that the deck railing is disposed between the transverse bar and the clamping bar and wherein the bolts and nuts compress the transverse bar and the clamping bar toward each other so as to clamp against opposite sides of the deck railing structure and suspend the privacy screen about the deck railing structure.

6. The portable privacy screen of claim 5 wherein the perimeter frame includes a base member and an upper portion and wherein the transverse bar is secured to the perimeter frame and extends across the perimeter frame intermediately between the base member and an upper portion of the perimeter frame.

7. The portable privacy screen of claim 4 wherein the perimeter frame includes a lower horizontal base member, a vertical side member secured to the base member and extending upwardly therefrom, and a curved connecting member interconnected between the base member and the vertical member.

8. The portable privacy screen of claim 4 wherein the hinge structure interconnecting the frame assemblies comprises a piano hinge structure.

9. The portable privacy screen of claim 6 wherein the perimeter frame includes a back side and wherein the transverse bar that forms a part of the deck railing mounting structure is secured to a side of the perimeter frame and lies outside of the plane of the perimeter frame but structurally reinforces the perimeter frame.

10. The portable privacy screen of claim 9 including a spacer mounted adjacent the base member of the perimeter frame and lying in substantially the same plane as a traverse member that forms a part of the deck railing mounting structure.

11. The portable privacy screen of claim 7 including a transverse bar fixedly connected between the vertical side member and the curved connecting member, and a clamping bar secured to the transverse bar by a series of bolts and nuts.

12. The portable privacy screen of claim 11 wherein the privacy screen includes front and back sides and wherein the transverse bar is secured to the back side of the privacy screen and wherein the privacy screen further includes a spacer bar secured to the back side of the privacy screen adjacent the lower horizontal member such that the spacer bar and the transverse bar generally lie one above the other.

13. A method of erecting a privacy screen about a deck structure that extends from a residential dwelling comprising: detachably securing a pliable privacy cover to an open frame structure; and securing the privacy screen including the open frame structure and pliable privacy cover to a railing that forms a part of the deck such that the privacy screen lies adjacent the railing and the railing, in part at least, supports and stabilizes the privacy screen and wherein when the privacy screen is attached to and supported by the railing, and wherein the privacy cover separates an interior portion of the deck structure from an area lying outside the deck structure.

14. The method of claim 13 including clamping the privacy screen to the railing such that the privacy screen including the open frame structure and the pliable privacy cover is suspended above a floor that forms a part of the deck structure such that the privacy screen is supported independently of the floor that forms a part of the deck.

15. A portable privacy screen adapted to be connected to a railing structure of a deck comprising: an open frame structure including a surrounding outer frame; a pliable cover adapted to be secured to the surrounding outer frame; fasteners for detachably securing the pliable cover to the frame structure; and a deck railing mounting structure associated with the frame structure for securing the frame structure to the railing structure of the deck, the deck railing mounting structure including at least one clamp adapted to clamp the frame of the privacy screen to a portion of the deck structure.

16. The portable privacy screen of claim 15 wherein the claim includes a transverse bar secured to the frame structure, a clamping bar, and a series of bolts and nuts for interconnecting the transverse bar to the clamping bar and wherein the portable screen can be mounted to the deck structure by clamping a portion of the deck railing structure between the transverse bar and the clamping bar.

17. A portable privacy screen adapted to be connected to a railing structure of a deck comprising: an open frame structure including a series of frame sections coupled together with each frame section including a surrounding outer frame; a pliable cover adapted to be secured to the surrounding outer frame of the frame sections; fasteners for detachably securing the pliable cover to the frame structure; and a deck railing mounting structure associated with the frame structure for securing the frame structure to the railing structure of the deck.

18. The privacy screen of claim 17 including a connector interconnected between two of the frame sections that allow one of said frame sections to move with respect to the other of said frame sections.

19. The privacy screen of claim 16 including a hinge structure interposed between adjoining frame sections that allow each of the frame sections to move with respect to the hinge structure.

20. The privacy screen of claim 19 wherein the hinge structure includes a piano hinge.

* * * * *